(12) United States Patent
Akahira

(10) Patent No.: US 6,387,562 B1
(45) Date of Patent: May 14, 2002

(54) NON-AQUEOUS ELECTROLYTE CELL COMPRISING ELECTRODE TERMINAL LEADS ATTACHED TO THE INNERMOST END OF A WOUND ELECTRODE ASSEMBLY

(75) Inventor: Sachio Akahira, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/421,939

(22) Filed: Oct. 21, 1999

(30) Foreign Application Priority Data

Oct. 30, 1998 (JP) ............................................. 10-311479

(51) Int. Cl.$^7$ .............................. H01M 6/10; H01M 2/06
(52) U.S. Cl. .......................... 429/94; 429/163; 429/211
(58) Field of Search .................. 429/94, 127, 162–163, 429/211, 99–100

(56) References Cited

U.S. PATENT DOCUMENTS

| | | | |
|---|---|---|---|
| 5,746,780 A | | 5/1998 | Narukawa et al. |
| 6,106,973 A | * | 8/2000 | Sonozaki et al. |
| 6,174,620 B1 | * | 1/2001 | Okada et al. |
| 6,242,130 B1 | * | 6/2001 | Noh et al. |
| 6,242,131 B1 | * | 6/2001 | Noh |
| 6,296,971 B1 | * | 10/2001 | Hara |
| 6,316,140 B1 | * | 11/2001 | Hatazawa et al. |

FOREIGN PATENT DOCUMENTS

| | | | |
|---|---|---|---|
| EP | 0 948 064 A1 | | 10/1999 |
| GB | 2 324 404 A | | 10/1998 |
| JP | 10-074538 A | * | 3/1998 |
| JP | 11-265732 A | * | 9/1999 |

* cited by examiner

Primary Examiner—Carol Chaney
Assistant Examiner—Susy Tsang-Foster
(74) Attorney, Agent, or Firm—Bell, Boyd & Lloyd LLC

(57) ABSTRACT

A non-aqueous electrolyte cell in which the cell capacity is improved and positioning accuracy of external terminals is assured. A unit cell is housed in an exterior packaging material of a laminated film and encapsulated on heat sealing. To elongated positive and negative electrodes of the unit cell are electrically connected electrode terminal leads which are exposed to outside of the exterior packaging material as the leads are surrounded by heat fused portions. The unit cell is a wound assembly of the positive and negative electrodes each of which is includes a current collector carrying a layer of an active material. The electrode terminal leads are mounted on the current collectors of the positive and negative electrodes in the vicinity of the innermost turn of the wound assembly. In manufacturing the unit cell, the positions of the electrode terminal leads are detected and positioned with respect to the flat winding arbor. The positive and negative electrodes then are wound on the winding arbor.

14 Claims, 5 Drawing Sheets

NON-AQUEOUS ELECTROLYTE CELL COMPRISING ELECTRODE TERMINAL LEADS ATTACHED TO THE INNERMOST END OF A WOUND ELECTRODE ASSEMBLY

RELATED APPLICATION DATA

The present application claims priority to Japanese Application No. P10-311479 filed Oct. 30, 1998 which application is incorporated herein by reference to the extent permitted by law.

BACKGROUND OF THE INVENTION

1. Field of the Invention

This invention relates to a non-aqueous electrolyte cell, comprised of a cell element accommodated in an exterior packaging material formed by a laminated film, and a manufacturing method therefor. More particularly, it relates to improvement in mounting position accuracy of electrode terminal leads.

2. Description of the Related Art

In a lithium ion polymer cell, employing an ion conductive polymer as an electrolyte, an electrolyte which is solid or gelated at ambient temperature, heat evolution or ignition is retarded significantly against rise in the internal temperature, internal shorting or shorting under an external pressure, such that measures for structural safety deemed to be necessary due to use in the conventional solution type lithium ion cells of the petroleum based liquid electrolyte, namely a) a gasket and caulking structure required for sealing the cell in a metal can which is a pressure vessel, b) a cleavage valve structure for evading the risk on rise in the internal pressure, c) a structure of thermally disconnecting external terminals on rise in the internal temperature, or d) a structure of raising the electric resistance across terminals on rise in the internal temperature become unnecessary such that the basic structure inclusive of an external packaging can possibly be simplified, thus assuring satisfactory external packaging on heat sealing an aluminum laminate film and shielding off the moisture even in the absence of special safety structures within the inside of the cell.

However, if this structure is actually used, positive and negative electrode plates need to be punched to the shape of a rectangle with exposed metal foil portions used for welding a lead plate, the positive and negative electrode plates being then arranged facing each other without overlapping of the exposed metal foil portions, to provide an assembly of the positive and negative electrode plates. A large number of such assemblies then are stacked together to complete a cell unit. In such structure, the surface of each positive electrode plate coated with an active material is set so as to be smaller in area than the surface of each negative electrode plate coated with an active material. In order to prevent possible contact of the exposed metal foil portion of the positive electrode with the negative electrode surface and consequent internal shorting, the portion of the exposed positive electrode foil portion overlapped with the negative electrode surface is coated with an insulating tape.

Also, a large number of positive electrode terminals and the negative electrode terminals, exposed on the lateral sides, are collected together to form external terminals. To this end, separate tab terminals are collectively welded on the overlapped exposed metal foil surfaces to form external terminals, over which laminated aluminum films are set to form a trim external cell package. However, with this method, it is necessary to put positive and negative electrodes alternately to form a cell unit, to weld separate tab terminals to provide external terminals, and to effect heat sealing of aluminum laminate films such as to evade welding margins, otherwise the welded portions of the positive and negative external terminals punch through the insulating layers of the inner wall sections of the aluminum laminate films to produce internal shorting through the aluminum laminate film. Since the cell suffering such internal shorting is discarded as a reject, the heat sealing needs to be performed such as to evade the welding margins, as mentioned above.

In such cell, the magnitude of the volumetric energy density, representing the cell capacity per a cell volume calculated from the maximum sizes in the length, width and height of the outer profile of the cell is diminished. Specifically, due to a) dimensional loss caused by punching electrode plates to rectangular shape so that the positive electrode will be smaller than the negative electrode, b) dimensional loss caused by protecting the exposed metal foil portion of the positive electrode against contact with the negative electrode, and c) dimensional loss caused by heat-sealing such as to evade welded portions of bundled exposed metal foil portions of the positive and negative electrodes to external terminals, the merit of the simpler external structure is not translated into capacity increase per volume.

On the other hand, if a cell employing an ion conductive polymer is to be constructed by wrapping an elongated positive terminal plate and an elongated negative terminal plate, the conventional practice is to wrap an electrode material, free of a portion not coated with an active material or a lead, to sever both electrodes to suitable lengths and to remove the ion conductive polymer and the active material on the outer side to weld the lead subsequently.

However, with the above structure, the process of wrapping an elongated electrode, severing the electrode to a suitable length and providing an exposed metal foil portion at an electrode end of each of the positive and negative electrodes disposed on the outer ends to weld the lead in position, is required, thus obstructing designing of a continuous production process. Moreover, in this process, part of the removed material tends to be entwined in the cell unit to precipitate an extraneous metal or to cause internal shorting.

In wrapping elongated positive and negative electrode plates, such a method has been proposed in which a portion not coated with an active material or with a polymer electrolyte is provided in an outer rim portion of the electrode plate, and one or both of the electrodes or both tab terminals are mounted in position before proceeding to wrapping. This structure is used in general in a square type version of the liquid-based lithium ion cell.

However, with the above structure, the position of the leads provided on the electrodes at the outer end is not constant, at the wrapping end, due to variations in thickness of the active material or to variations in thickness of the ion conductive polymer. In an extreme case, when an external packaging material is applied, the positive and negative terminals are superposed to produce shorting. Therefore, an extremely high degree of accuracy is required in connection with thickness variations of the active material and the polymer electrolyte, thus unnecessarily raising equipment cost and lowering the production yield.

SUMMARY OF THE INVENTION

It is therefore an object of the present invention to provide a cell having a spirally wound electrode and an ion conductive polymer, as an electrolyte, in which the cell capacity within the cell exterior package is improved and the production process of the spiral electrode is simplified while the external terminal is improved in positional accuracy.

In one aspect, the present invention provides a non-aqueous electrolyte cell in which a unit cell is housed in an exterior packaging material of a laminated film and encapsulated on heat fusion, and in which electrode terminal leads electrically connected to positive and negative electrodes of the unit cell are exposed to outside of the exterior packaging material as the electrode terminal leads are surrounded by heat-fused portions, wherein the unit cell is a wound assembly of elongated positive and negative electrodes each being constituted by a current collector and a layer of an active material formed thereon and wherein the electrode terminal leads are mounted on the current collectors of the positive and negative collectors in the vicinity of the innermost end of the wound assembly.

In another aspect, the present invention provides a non-aqueous electrolyte cell in which n unit cell is housed in an exterior packaging material of a laminated film and encapsulated on heat fusion, and in which electrode terminal leads electrically connected to positive and negative electrodes of the unit cell are exposed to outside of the exterior packaging material as the electrode terminal leads are surrounded by heat-fused portions, wherein the unit cell is a wound assembly of an elongated positive electrode and an elongated negative electrode, said positive and negative electrodes being each formed by a current collector on both sides of which are formed layers of an active material, and wherein the electrode terminal leads are mounted on the current collectors of the positive and negative electrodes in the vicinity of the innermost turn of the wound assembly.

In yet another the present invention provides a method for manufacturing a non-aqueous electrolyte cell in which a layer of an active material is formed on a current collector and an electrode terminal lead is attached thereto to form an elongated positive electrode, another layer of an active material is formed on another current collector and another electrode terminal lead is attached thereto to form an elongated negative electrode, the positive and negative electrodes being wound on a flat winding arbor, the resulting wound assembly then being encapsulated in an exterior packaging material of a laminated film and sealed on heat fusion, wherein the method includes detecting the positions of the electrode terminal leads, positioning the electrode terminal leads with respect to the flat winding arbor, and winding the positive and negative terminals on the winding arbor.

According to the present invention, since no redundant space is required, the cell capacity within a given dimension of the exterior packaging material of the cell can be improved, at the same time as the manufacturing process is simplified and the positioning accuracy of the external terminals is assured.

DESCRIPTION OF THE PREFERRED EMBODIMENTS

Figure 1:
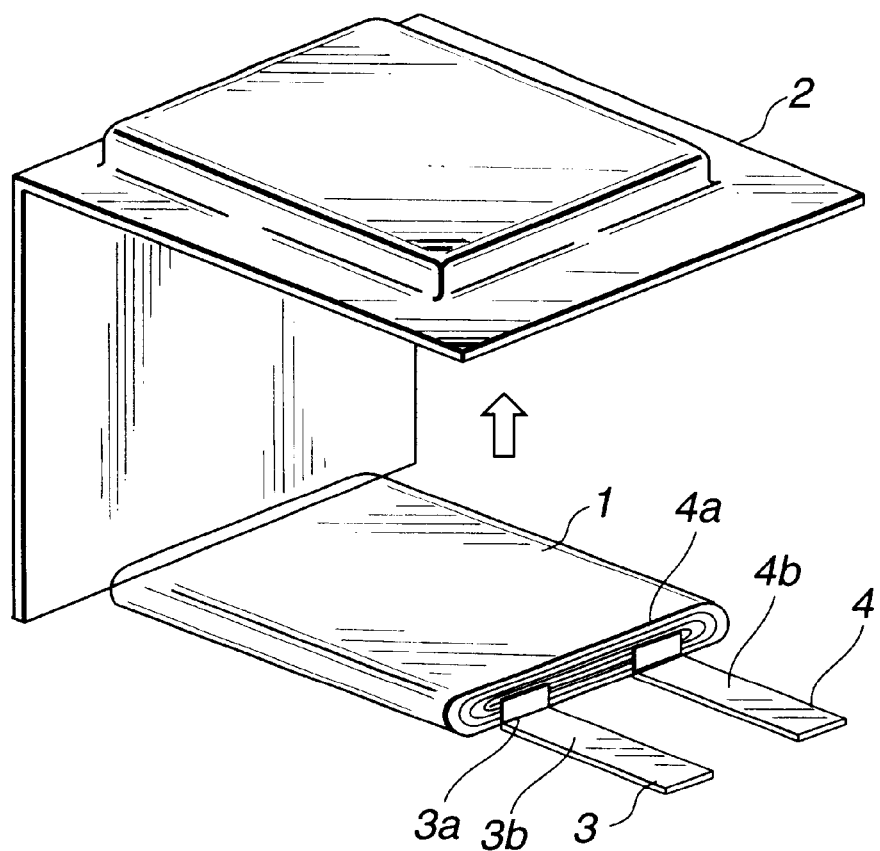
FIG. 1 is an exploded perspective view showing an illustrative structure of a solid electrolyte cell embodying the present invention.

Referring to the drawings, the structure of a non-aqueous electrolyte cell according to the present invention will be explained in detail.

Figure 2:
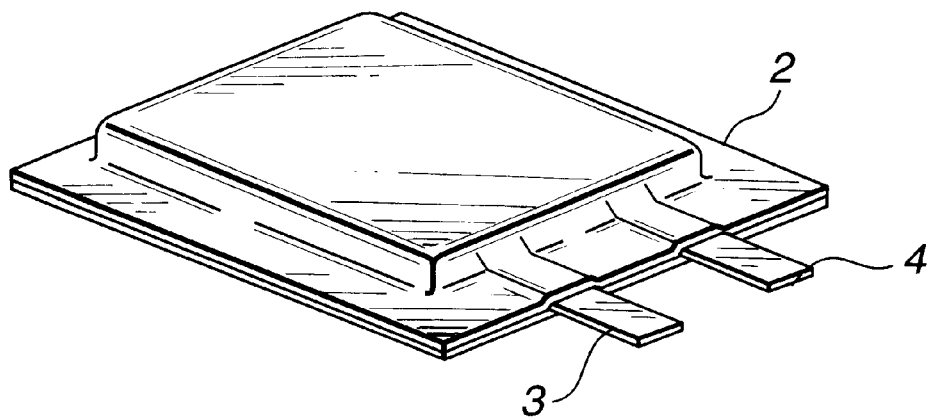
FIG. 2 is a schematic perspective view showing an illustrative structure of a solid electrolyte cell embodying the present invention.

The non-aqueous electrolyte cell of the present invention is, for example, a solid electrolyte cell or a gel-like electrolyte cell. Referring to FIGS. 1 and 2, an unit cell 1, comprised of the solid electrolyte or the gel-like electrolyte, arranged between a layer of an active material of a positive electrode and a layer of an active material of a negative electrode, is accommodated in an packaging material 2 of a laminated film obtained on molding with deep drawing in meeting with the shape of the unit cell 1, and the rim portion of the resulting assembly is heat-fused for hermetic sealing.

The unit cell 1 is provided with a negative terminal lead 3 and a positive terminal lead 4, electrically connected to the negative and positive electrodes of the unit cell 1, respectively. The negative terminal lead 3 and the positive terminal lead 4 are drawn outwardly of the packaging material 2.

The negative terminal lead 3 and the positive terminal lead 4 are mounted on the innermost turn of the spirally wound type unit cell 1 and hence are drawn out from the center of the unit cell 1.

Directly after being drawn from the center of the unit cell 1, the negative and positive terminal lead 3, 4 are bent in a crank shape along an end face of the unit cell 1 so as to have bent drawn-out portions 3a, 3b and 4a, 4b, respectively. The drawn-out portions 3b, 4b are substantially flush with a lateral side of the unit cell 1 to give a structure in which there is no necessity of providing a redundant space area for the packaging material 2.

In the non-aqueous electrolyte cell of the present invention, since the negative and positive terminal lead 3, 4 are both mounted at an innermost turn of the spirally-shaped unit cell 1 to improve the mounting position accuracy significantly. The reason therefor is now explained in connection with the manufacturing process for the cell.

For preparing the spirally-shaped unit cell 1, strip-shaped positive and negative electrodes are placed around a arbor. According to the present invention, a negative terminal lead 13 and a positive terminal lead 14 are mounted and secured from the outset to a negative electrode 11 and to a positive electrode 12 by any suitable technique, such as spot welding.

The negative electrode 11 includes a current collector 11a, on each side of which is formed a layer of an active material 11b. This active layer 11b is partially removed to expose the current collector 11a and the negative terminal lead 13 is mounted on the exposed portion of the current collector 11a. In the negative electrode 11, the solid electrolyte or the gel-like electrolyte is coated on the entire surface thereof to prevent shorting otherwise caused by the current collector 11a or the negative terminal lead 13 being exposed to outside. For prohibiting the shorting, an insulating film may be bonded in position.

The positive electrode 12 similarly includes a current collector 12a, on each side of which is formed a layer of an active material 12b. This active layer 12b is partially removed to expose the current collector 12a and the positive terminal lead 14 is mounted on the exposed portion of the current collector 12a. The surface of the positive electrode 12 is coated with the solid electrolyte or the gel-like electrolyte in its entirety.

The negative electrode 11 and the positive electrode 12 are then wound on an arbor, which herein is a flat arbor 15.

The negative terminal lead 13 and the positive terminal lead 14 are detected by, for example, a sensor, and are mechanically set at a preset spacing from, for example, a lateral end of the flat arbor 15 to determine the winding start position of the negative electrode 11 and the positive electrode 12. The positions of the negative terminal lead 13 and the positive terminal lead 14 are not changed in this manner by winding such that the leads are maintained in position.

Figure 4:
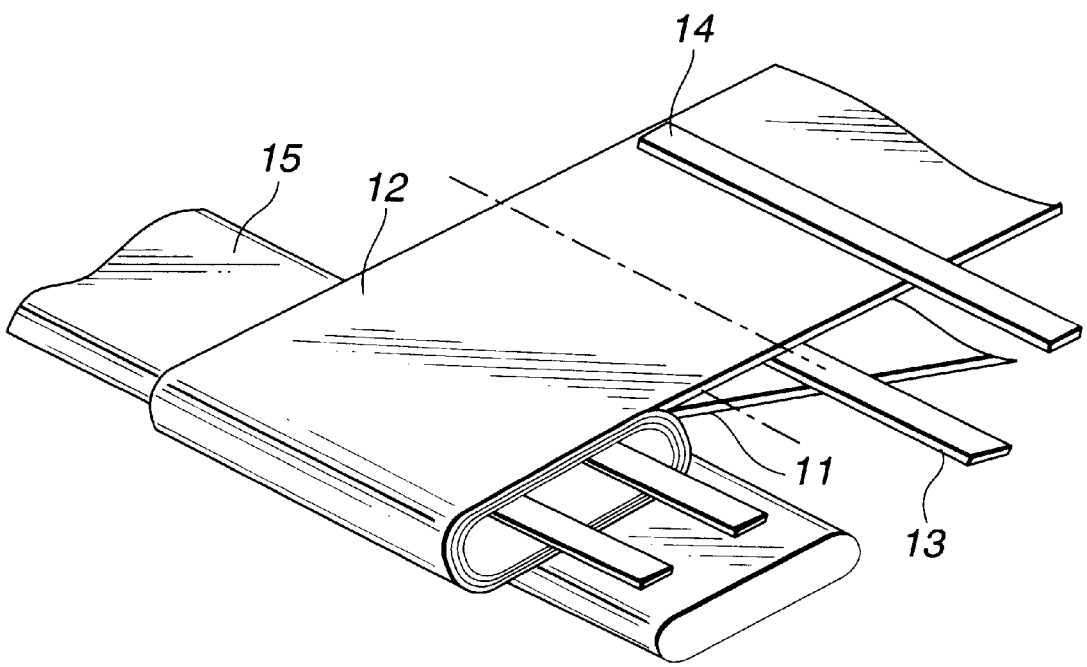
FIG. 4 is a schematic perspective view showing the wrapping end state on a flat arbor.

After the end of the winding, the negative electrode 11 and the positive electrode 12 are severed at a position ahead of the next negative terminal lead 13 and the positive terminal lead 14, indicated by chain-dotted lines in FIG. 4. The flat arbor 15 then is drawn out from a wound assembly 16, which then is collapsed by a crusher 17.

The resulting wound assembly 16 (unit cell) is accommodated in an packaging material and sealed to complete the cell.

According to the present invention, tab terminals (negative terminal lead 13 and the positive terminal lead 14) are welded at the outset to the exposed metal foil portions of elongated electrode sheets. An insulating material is provided at a position facing the counterpart electrode and the negative and positive electrode sheets are arrayed on the inner side of the turns of the winding. This sequence of operations is repeated to enable the positive and negative electrodes to be fed to the manufacturing system in the form of a roll-like elongated reels to assure a continuity in the manufacturing process.

The operation of setting the severing positions of the electrodes is performed by the sensor detecting the tab terminals protruded from the width range of the electrodes. Since the lead mounting position and the severing positions are necessarily close to each other, and the tab terminal mounting positions are initially set at the winding start side, the tab terminal positions are detected as reference positions in the continuous manufacturing process and are set at predetermined positions on the arbor to start the electrode sheet winding operation. This sequence of operations is repeated. Thus, the tab terminal positions of the cell element are arranged in stability at pre-set positions of the outer configuration of the unit cell. Although the exterior packaging material such as the laminated aluminum film is assembled with the outer configuration of the unit cell as reference, the terminals protruded from the exterior packaging material after mounting the exterior packaging material can be maintained to high accuracy because the tab terminal positions are kept to high precision in stability with respect to the outer configuration of the unit cell.

If the unit cell 1 in the non-aqueous electrolyte cell of the present invention is a solid electrolyte cell or a gel-like electrolyte cell, the high molecular material used as the high-molecular solid electrolyte may be a silicon gel, an acrylic gel, an acrylonitrile gel, a polyphosphasen modified polymer, polyethylene oxide, polypropylene oxide, compound polymers or cross-linked polymers or modified polymers thereof, or fluorine-based polymers, such as, for example, poly(vinylidene fluoride), poly(vinylidene fluoride-co-hexafluoro propylene), poly(vinylidene fluoride-co-tetrafluoro ethylene) or poly(vinylidene fluoride-co-trifluoro ethylene), and mixtures thereof, only by way of examples.

The solid electrolyte or gel-like electrolyte, layered on the active layer 12b for the positive electrode or the active layer 11b for the negative electrode, is obtained on impregnating the active layer 12b or the active layer 11b with a solution composed of a high molecular compound, an electrolyte salt and a solvent and on removing the solvent. If the electrolyte is the gel-like electrolyte, a plasticizer is added to the solvent. The solid electrolyte or the gel-like electrolyte, layered on the active layer 12b or on the active layer 11b, has its portion solidified by being impregnated with the active layer 12b or the active layer 11b. If a cross-linked system is desired, the electrolyte is cross-linked by light or heat for solidification.

The gel-like electrolyte is composed of a matrix high polymer in an amount of 2 wt % to 30 wt % and a plasticizer containing lithium salts. In this case, esters, ethers or ester carbonates may be used alone or as ingredients of the plasticizer.

In adjusting the gel-like electrolyte, a wide variety of high molecular materials used for constructing the gel-like electrolyte may be used as the matrix high polymer which gelates carbonic acid esters. For oxidation/reduction stability, fluorine-based high molecular materials, such as poly(vinylidene fluoride) or poly(vinylidene fluoride-co-hexafluoro propylene), are preferably used.

The high-molecular solid electrolyte is composed of a lithium salt and a high molecular compound dissolving it. As the high molecular compound, ether-based high molecular materials, such as poly(ethylene oxide) or a cross-linked ether-based high molecular material, a poly(methacrylate) esters, acrylates, poly(vinylidene fluoride) or poly(vinylidene fluoride-co-hexafluoro propylene), may be used alone or in combination. However, for oxidation/reduction stability, fluorine-based high molecular materials, such as poly(vinylidene fluoride) or poly(vinylidene fluoride-co-hexafluoro propylene), are preferably used.

As the lithium salts to be contained in the gel-like electrolyte or high-molecular solid electrolyte, those used in routine cell electrolytic solution may be used. Only by way of examples, the lithium compounds (salts) may be enumerated by lithium chloride, lithium bromide, lithium iodide, lithium chlorate, lithium perchlorate, lithium bromate, lithium iodate, lithium nitrate, tetrafluorolithium borate, hexafluorolithium phosphate, lithium acetate, bis (trifluoromethane sulfonyl) imido lithium, $LiAsF_6$, $LiCF_3SO_3$, $LiC(SO_2CF_3)_3$, $LiAlCl_4$ and $LiSiF_6$.

These lithium compounds may be used sole or in combination. Of these, $LiPF_6$ and $LiBF_4$ are desirable in view of oxidation stability.

The concentration of lithium salts is 0.1 to 3.0 mol and preferably 0.5 to 2.0 mol per liter of the plasticizer.

The cell according to an embodiment of the present invention may be constructed in the same way as in a conventional lithium ion cell except using the above-described gel-like electrolyte or solid electrolyte.

That is, such a material that is able to dope/undope lithium can be used as a negative electrode material of a lithium ion cell. The constituent material for the negative electrode, such as a carbon material, for example, a difficultly graphizable carbonaceous material or graphite material, may be used. More specifically, carbon materials, including pyrocarbon, cokes (pitch cokes, needle cokes or petroleum cokes), graphite, vitreous carbons, sintered organic high molecular compounds (phenolic resins or furane resins, fired and carbonified at a moderate temperature), carbon fibers, and activated charcoal, may be used. Other materials that can dope/undope lithium include high molecular compounds, such as polyacetylene or polypyrrole, or oxides, such as $SnO_2$, may be used. In preparing a negative electrode, known types of binders may be added, if desired.

The positive electrode may be constructed, using high molecular compounds, such as metal oxides, metal sulfides or specified high molecular materials, as the active material for the positive electrode, depending on the type of the cell to be prepared. If, for example, a lithium ion cell is to be prepared, lithium-free metal sulfides or oxides, such as $TiS_2$, $MoS_2$, $NbSe_2$ or $V_2O_5$ or compound oxides of lithium, mainly composed of $Li_xMO_2$, where M denotes at least one of transition metals and x is usually 0.05 to 1.10 depending on the charging/discharging state of the cell, may be used as the active material for the positive electrode. The transition metal M of the compound oxide of lithium is preferably Co, Ni or Mn. Specified examples of the compound oxide of lithium include $LiCoO_2$, $LiNiO_2$, $LiNi_yCo_{1-y}O_2$, where $0<y<1$, or $LiMn_2O_4$. The compound oxide of lithium is able to develop a high voltage and serves as an active material for the positive electrode having a superior energy density. Plural sorts of the active material for the positive electrode may be used as the positive electrode. In preparing a positive electrode, known types of electrically conductive materials or binders may be added, if desired.

The present invention may be used for both a primary cell and a secondary cell.

EXAMPLES

Specified Examples of the present invention are hereinafter explained.

Example
Preparation of Strip-Shaped Positive Electrode Sheet 85 parts by weight of $LiCoO_2$, 5 parts by weight of artificial graphite powders and 5 parts by weight of carbon black, were sufficiently kneaded and subsequently added to with polyvinylidene fluoride (PVDF) dissolved in N-methyl-2-pyrrolidone, as a solid content, so that the solid content will amount to 5 parts by weight. This yielded an ink-like positive electrode slurry.

This positive electrode slurry was intermittently coated on both ides of an aluminum foil (current collector) to a width of 300 mm and a thickness of 20 $\mu$m. The interval of approximately 21 mm between neighboring pitches was left as an exposed metal foil portion not coated with the positive electrode slurry. After drying, the resulting positive electrode mass was pressed by a roll press. After rolling, the resulting positive electrode sheet was cut to eight strips, each of a width of 28 mm, and wound as eight elongated positive electrode reels, which were then dried in vacuum.

The electrode reel was unrolled, and an aluminum tab terminal, having a width of 5 mm, a length of 38 mm and a thickness of 100 $\mu$m, was ultrasonically welded to the exposed metal foil portion so that the tab terminal is protruded by not less than 8 mm from the electrode end face. A polyimide tape, as an insulating material, was then stuck to each of the front and back surfaces of the exposed metal foil portions to which the tab terminal was welded. The tape was stuck so that it affects the portion of the tab terminal protruded from the electrode end face. The above process was carried out continuously and the elongated electrode so processed was taken up again.

As an ion conductive polymer, 20 parts by weight of polyvinylidene fluoride (PVDF), dissolved in dimethyl carbonate (DMC), as a solid content, 8 parts by weight of lithium salt, and 72 parts by weight of ethylene carbonate (EC) and propylene carbonate (PC) were added to yield a mixture which was stirred under keeping the temperature to give a mixed solution.

This mixed solution was continuously coated on both sides of the positive electrode strip, using a hot melt applicator. On drying, the mixed solution of the coated ion conductive polymer was impregnated in voids within the active material, while DMC as the low boiling solvent was vaporized off to form a rubber-like gel polymer film.

This ion conductive polymer, coated continuously, was coated on both surfaces of the tab terminals. Thus, the elongated positive electrode strip, fitted with tab terminals, was again taken up.

Preparation of Strip-Like Negative Electrode

As a negative electrode, 95 parts by weight of natural graphite, having a particle size of 5 to 25 $\mu$m, with an inter-layer distance of 3.35 Å, and 5 parts by weight of PVDF, dissolved in N-methyl-2-pyrrolidone, as a solid content, were added, so that the solid content will amount to 5 parts by weight. This yielded an ink-like positive electrode slurry.

This positive electrode slurry was intermittently coated with a pitch of approximately 248 mm on both sides of a copper foil (current collector) of a width of 300 mm and a thickness of 15 $\mu$m. The interval of approximately 21 mm between neighboring pitches was left as an exposed metal foil portion not coated with the positive electrode slurry. After drying, the resulting positive electrode mass was pressed by a roll press. After rolling, the resulting negative electrode sheet was cut to eight strips, each of a width of 30 mm, and wound as eight elongated positive electrode reels, which were then dried in vacuum.

The electrode reel was unrolled, and a nickel tab terminal, having a width of 5 mm, a length of 39 mm and a thickness of 100 $\mu$m, was ultrasonically welded to the exposed metal foil portion so that the tab terminal is protruded by not less than 7 mm from the electrode end face. A polyimide tape, with a width of 19 mm, as an insulating material, was then stuck to each of the front and back surfaces of the exposed metal foil portions of the tab terminal to which the tab terminal was welded. The tape was stuck so that it affects the portion of the tab terminal protruded from the electrode end face by a length of not less than 2 mm. The above process was carried out continuously and the elongated electrode so processed was taken up again.

As the ion conductive polymer, the same mixed solution that was used for the positive electrode was used.

This mixed solution was continuously coated on both sides of the positive electrode strip, using a hot melt applicator. On drying, the mixed solution of the coated ion conductive polymer was impregnated in voids within the active material, while DMC as the low boiling solvent was vaporized off to form a rubber-like gel polymer film. This elongated positive electrode strip, fitted with tab terminals, coated with the ion conductive polymer, was again taken up.

Preparation of Helical Electrode

The negative electrode strip was arranged at a pre-set position of a flat winding core, with the tab terminal at the leading end, using the mounting position of the tab terminal as the reference position.

Figure 3:
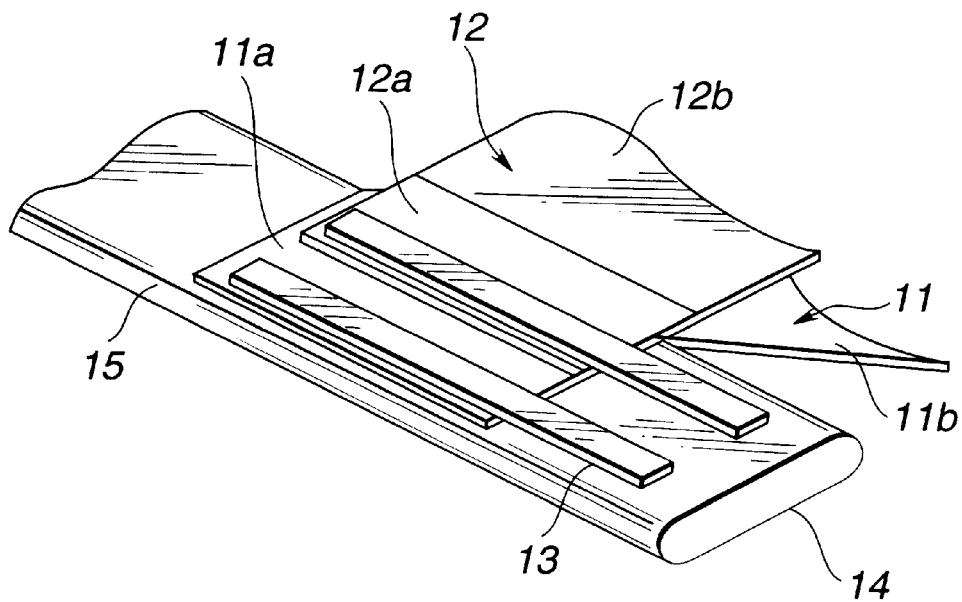
FIG. 3 is a schematic perspective view showing the wrapping start state on a flat arbor.

The positive electrode strip was arranged, with the tab terminal at the leading end, using the mounting position of the tab terminal as the reference position, so that the positive electrode strip was superposed on the negative electrode sheet (see FIG. 3).

The positive and negative electrode strips are previously severed by a cutter, with the tab terminal position as a reference position. The distance from the severed surface up to the tab terminal is stable, while both surfaces of the electrode strips are coated with the polymer electrolyte, along their entire lengths, so that the metal portions exposed on the severed surface are not contacted directly with each other, and hence there is no risk of shorting. On the other hand, since the polymer electrolyte exhibits moderate tackiness, the mechanically planar winding core and the electrode strips are not likely to slip off from initial positions, so that the process can smoothly transfer to the step next to the winding step.

After a pre-set number of turns are completed, the unit cell is severed, with the tab terminal position of the next following electrode pattern as a reference (see FIG. 4).

Figure 5:
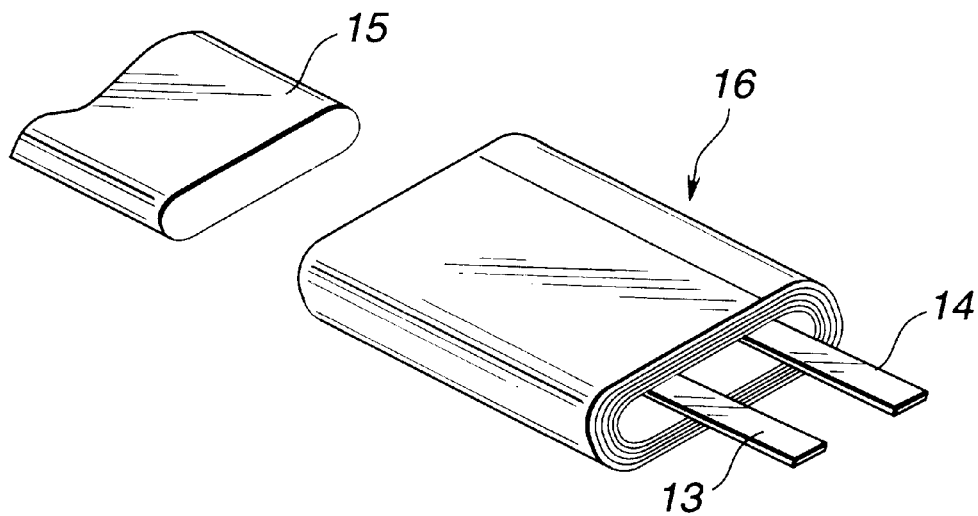
FIG. 5 is a schematic perspective view showing the extracted state of the flat arbor.

The unit cell then is dismounted from the flat winding core (see FIG. 5). The unit cell, just dismounted from the winding core, has a hollow portion corresponding in shape to the winding core.

Figure 6:
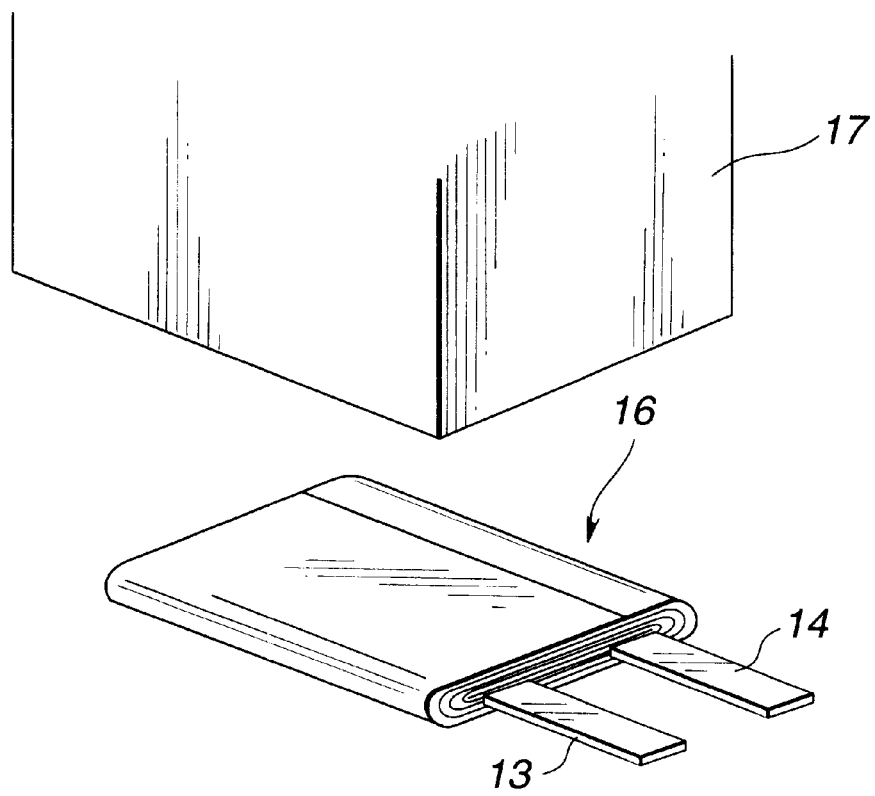
FIG. 6 is a schematic perspective view showing the collapsed state of a winding member.
Figure 7:
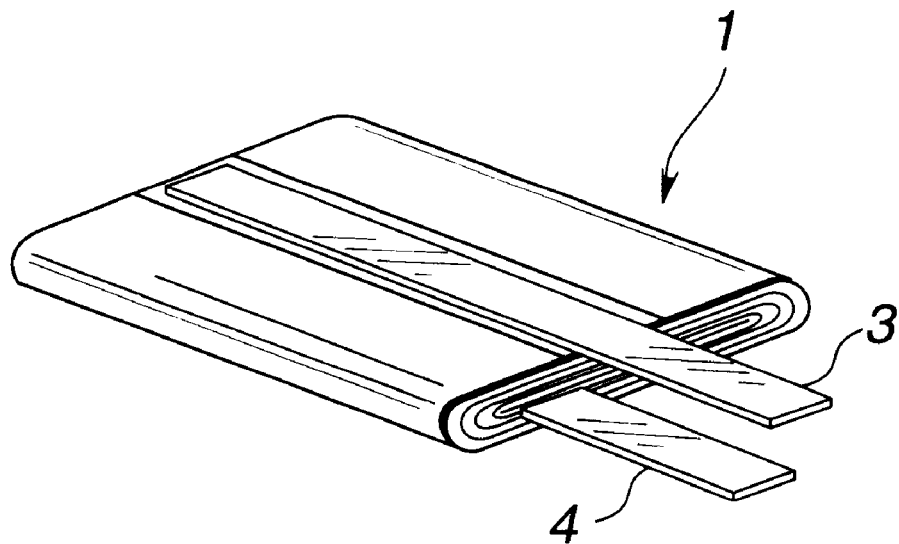
FIG. 7 is a schematic perspective view showing an unit cell having a negative terminal lead arranged on the outer side of the winding member.
Figure 8:
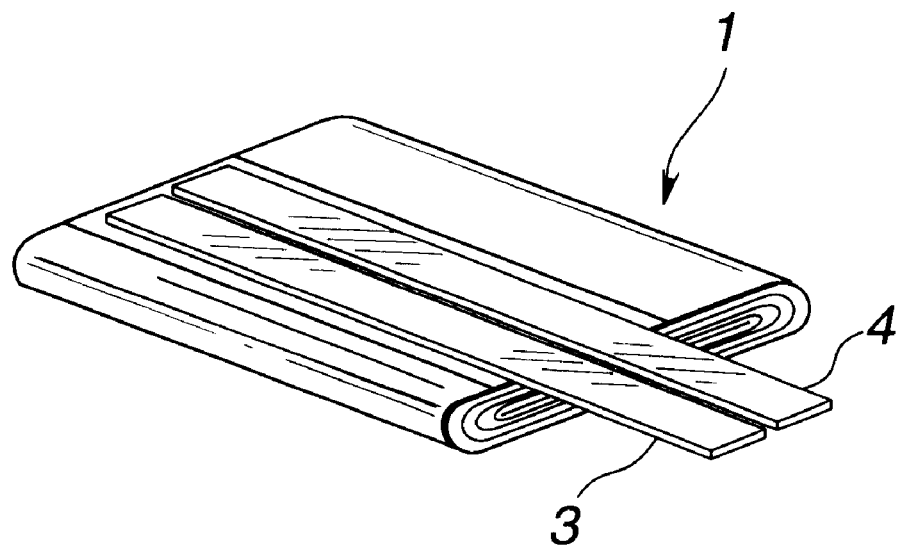
FIG. 8 is a schematic perspective view showing an unit cell having a negative terminal lead and a positive terminal lead arranged outside of the winding member.

The flat unit cell, presenting the internal hollow portion, then is collapsed to a flatter shape, by a crusher, until the internal hollow portion is eliminated (see FIG. 6). The permanent deformation of the unit cell at this time is limited to the shearing deformation between the electrode layers in the vicinity of both ends of the flat element presenting the internal hollow portion. Since the winding core is flat in shape, the shearing deformation between the two layers is mostly limited to the moderate deformation of the of the polymer electrolyte layer.

On the other hand, between the electrode layers of straight portions fitted with the tab terminals or between the electrode layers on both sides of the flat winding core as the axis of symmetry, there is induced no shear stress possibly leading to shear deformation, other than the compression at the time of collapsing the unit cell, because of the flat shape of the winding core, thus maintaining the wound state of the unit cell.

The unit cell is then stamped, such as to offset the tab terminals derived from the inner portion of the turns of the electrode layers towards both lateral sides, so as to be then accommodated in an exterior packaging material of the laminated aluminum film molded by deep drawing to profile the outer shape of the unit cell.

The exterior packaging material of the laminated aluminum film then is folded back on itself along its mid line to enclose the unit cell. The opened three sides of the exterior packaging material then are sealed using a heat-sealing device and a vacuum heat sealing unit.

The tab terminals serving as positive and negative terminals are protruded as external terminals from the exterior packaging material of the cell a pre-set length. This completes the manufacture of the polymer cell.

Comparative Example 1

An unit cell was prepared, with the negative terminal lead 3 arranged on the outer side of the winding. The electrode positions relative to the flat winding core were set so that the active material of the positive electrode and that of the negative electrode face each other, using a pre-set reference. The electrode layers were then wrapped around the electrodes and the resulting assembly was extracted from the winding core as in the Example described above. The resulting assembly was collapsed by a crusher and shaped so that the tab terminals are offset to lateral sides of the unit cell. The resulting wound product was sheathed in an aluminum laminate film, obtained on deep drawing, as an exterior packaging. The resulting product was heat-sealed on three sides, as in the Example described above.

Although the negative terminal lead 3 is arranged in this Comparative Example on the outer side of the winding, it is of course possible to arrange the positive terminal lead on the outer side of the winding to serve as the similar Comparative Example.

Comparative Example 2

Both the negative terminal lead 3 of the negative terminal and the positive terminal lead 4 of the positive terminal were placed on the outer side of the winding. The electrode positions relative to the flat winding core were set so that the active material of the positive electrode and that of the negative electrode face each other, using a pre-set reference. The electrode layers were then wrapped around the electrodes and the resulting assembly was extracted from the winding core as in the Example described above. The resulting assembly was collapsed by a crusher and shaped so that the tab terminals are offset to lateral sides of the unit cell. The resulting wound product was sheathed in an aluminum laminate film, obtained on deep drawing, as an exterior packaging. The resulting product was heat-sealed on three sides, as in the Example described above.

Figure 9:
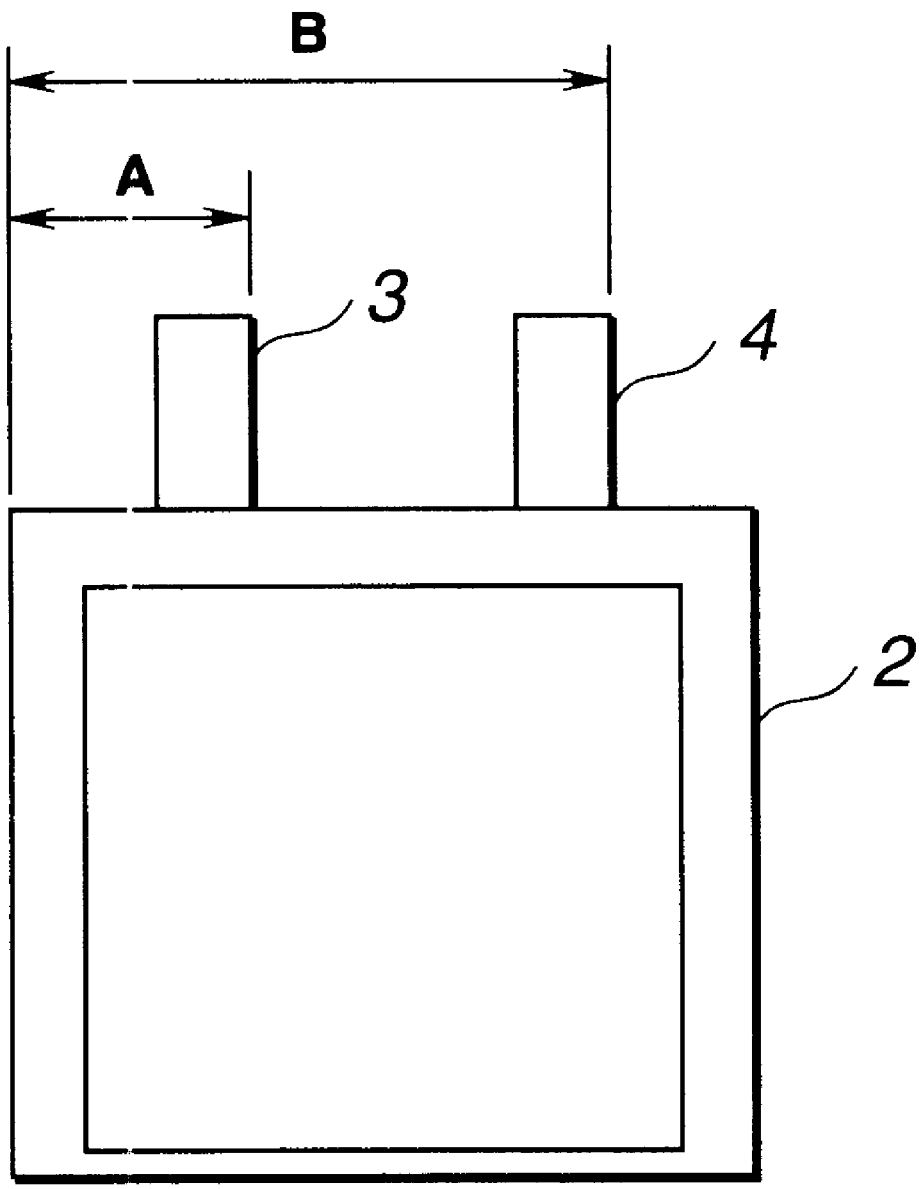
FIG. 9 is a plan view showing measured dimensions.

Results of Evaluation 20 unit cells having the same cell capacity were prepared by the methods of the Example and the Comparative Examples 1 and 2. After trimming the outer shape, the sizes of terminals protruded to outside were measured. The measured sizes are as shown in FIG. 9.

The results are shown in Table 1.

TABLE 1

|  | size of negative terminal A (mm) | size of positive terminal B (mm) |
| --- | --- | --- |
| Example | 26 ± 0.3 | 34 ± 0.3 |
| Comparative Example 1 | 26 ± 1.3 | 34 ± 0.3 |
| Comparative Example 2 | 26 ± 1.2 | 34 ± 1.3 |

As may be seen from the measured results, the size of the tab terminal as measured from the end of the aluminum package is within ±0.3 mm for both the negative terminal A and the positive terminal B. This magnitude represents significantly high dimensional accuracy taking into account the fact that the outer size of the aluminum laminate package is not of strictly high accuracy.

Conversely, with the Comparative Example 1, the dimensional accuracy variance of the negative terminal A is ±1.3 mm which is worse than that of the Example, however, the dimensional accuracy variance of the negative terminal B is within the satisfactory value as in the Example. If, with the dimensional accuracy variance of the negative terminal A as much as ±1.3 mm, this cell is loaded on and welded to an external equipment, the terminal width of the external equipment needs to be 5 mm+1.3 mm×2=7.6 mm or more for the terminal width of 5 mm of the present negative terminal. If welding is by an automatic device, the weld spot needs to be 5 mm–1.3 mm ×2=2.4 mm or less in view of possible deviation of the weld spot from the terminal position. Therefore, the above-mentioned variance may be said to be unacceptable if, in automated process, a reliable welding process and a positive process ability are targeted.

In the Comparative Example 2, both the size of the negative terminal A and that of the positive terminal B exhibit significant variance amounting to ±1.2 mm and ±1.3 mm. These variances may be said to be undesirable for the same reason as above.

The variable sizes of the Comparative Examples 1 and 2 are ascribable to the arrangement of the tab terminals arranged on the outer side of the wound cell element. Obviously, the thickness variations in the layers of the active material and those in the layer of the polymer electrolyte subsequently applied lead to deviation of the tab terminal positions from the targeted positions due to variations in the circumferential length difference caused by winding.

In the preferred embodiment, the tab terminals are welded at the outset, protective tapes are then applied and an ion conductive polymer then is coated thereon. It is however possible to apply the ion conductive polymer at the outset intermittently to generate exposed metal foil portions or to apply the ion conductive polymer first and to partially remove the applied ion conductive polymer to then weld the lead and bond the protective tape in position, in order to achieve comparable results. However, the protective tape needs to cover the entire exposed surface of the metal foil.

What is claimed is:

1. A non-aqueous electrolyte cell in which a unit cell is housed in an exterior packaging material of a laminated film and encapsulated on heat fusion, and in which electrode terminal leads electrically connected to positive and negative electrodes of said unit cell are exposed to outside of the exterior packaging material as said electrode terminal leads are surrounded by heat-fused portions, wherein said unit cell is a wound assembly of elongated positive and negative electrodes each being constituted by a current collector and a layer of an active material formed thereon, wherein said electrode terminal leads are mounted on the current collectors of the positive and negative collectors in the vicinity of the innermost end of said wound assembly, and wherein said electrode terminal leads are bent on one end face of said wound assembly so as to be flush with a lateral side of said wound assembly.

2. The non-aqueous electrolyte cell according to claim 1 wherein said wound assembly is flat-shaped.

3. The non-aqueous electrolyte cell according to claim 1 wherein an electrolyte of said unit cell is at least one of a gelled electrolyte and a solid electrolyte containing a matrix high polymer and lithium salts.

4. The non-aqueous electrolyte cell according to claim 3 wherein the current collectors of the positive and negative electrodes are exposed in the innermost turn of said wound assembly for attachment of the electrode terminal leads thereto, and wherein the current collectors and the electrode terminal leads are covered with at least one of the gelled electrolyte and the solid electrolyte.

5. The non-aqueous electrolyte cell according to claim 1 wherein the negative electrode of said unit cell comprises a material capable of doping and undoping lithium.

6. The non-aqueous electrolyte cell according to claim 5 wherein the material capable of doping and undoping lithium comprises a carbon-based material.

7. The non-aqueous electrolyte cell according to claim 1 wherein the positive electrode of said unit cell comprises a compound oxide of lithium and transition metals.

8. A non-aqueous electrolyte cell in which a unit cell is housed in an exterior packaging material of a laminated film and encapsulated on heat fusion, and in which electrode terminal leads electrically connected to positive and negative electrodes of said unit cell are exposed to outside of the exterior packaging material as said electrode terminal leads are surrounded by heat-fused portions, wherein said unit cell is a wound assembly of an elongated positive electrode and an elongated negative electrode, said positive and negative electrodes being each formed by a current collector on both sides of which are formed layers of an active material, wherein said electrode terminal leads are mounted on the current collectors of the positive and negative electrodes in the vicinity of the innermost turn of said wound assembly, and wherein said electrode terminal leads are bent on one end face of said wound assembly so as to be flush with a lateral side of said wound assembly.

9. The non-aqueous electrolyte cell according to claim 8 wherein said wound assembly is flat-shaped.

10. The non-aqueous electrolyte cell according to claim 8 wherein an electrolyte of said unit cell is at least one of a gelled electrolyte and a solid electrolyte containing a matrix high polymer and lithium salts.

11. The non-aqueous electrolyte cell according to claim 10 wherein the current collectors of the positive and negative electrodes are exposed in the innermost turn of said wound assembly for attachment of the electrode terminal leads thereto and wherein the current collectors and the electrode terminal leads are covered with at least one of the gelled electrolyte and the solid electrolyte.

12. The non-aqueous electrolyte cell according to claim 8 wherein the negative electrode of said unit cell comprises a material capable of doping and undoping lithium.

13. The non-aqueous electrolyte cell according to claim 12 wherein the material capable of doping and undoping lithium comprises a carbon-based material.

14. The non-aqueous electrolyte cell according to claim 8 wherein the positive electrode of said unit cell comprises a compound oxide of lithium and transition metals.

* * * * *